US008401776B2

(12) United States Patent
Roman et al.

(10) Patent No.: US 8,401,776 B2
(45) Date of Patent: Mar. 19, 2013

(54) AUTOMATIC DETERMINATION OF AIRCRAFT HOLDING LOCATIONS AND HOLDING DURATIONS FROM AIRCRAFT SURVEILLANCE DATA

(75) Inventors: Stephen T. Roman, Syracuse, NY (US); Collen J. Knickerboker, Fayetteville, NY (US); Benjamin S. Levy, Manlius, NY (US)

(73) Assignee: Saab Sensis Corporation, Wilmington, DE (US)

( * ) Notice: Subject to any disclaimer, the term of this patent is extended or adjusted under 35 U.S.C. 154(b) by 0 days.

(21) Appl. No.: 13/597,583

(22) Filed: Aug. 29, 2012

(65) Prior Publication Data

US 2012/0323475 A1 Dec. 20, 2012

Related U.S. Application Data

(60) Continuation-in-part of application No. 13/396,938, filed on Feb. 15, 2012, now Pat. No. 8,275,541, which is a division of application No. 12/325,405, filed on Dec. 1, 2008, now Pat. No. 8,145,415.

(60) Provisional application No. 60/990,985, filed on Nov. 29, 2007.

(51) Int. Cl.
*G06F 19/00* (2011.01)
*G06G 7/70* (2006.01)
*G06G 7/76* (2006.01)

(52) U.S. Cl. ............ 701/120; 701/1; 701/117; 701/119; 701/300; 340/938; 340/945; 340/500; 340/527; 708/200; 708/202; 708/445; 708/805

(58) Field of Classification Search ................ 701/1, 25, 701/16, 117, 119, 120, 200, 201, 300; 340/934, 340/938, 945, 951, 973; 708/146, 200–236, 708/445, 533, 805, 809; 712/2, 3, 4, 7, 32, 712/221, 222; 703/2, 6, 7, 8
See application file for complete search history.

(56) References Cited

U.S. PATENT DOCUMENTS

| | | | | |
|---|---|---|---|---|
| 6,650,948 | B1 | 11/2003 | Atkinson et al. | |
| 7,501,976 | B2 | 3/2009 | Manor | |
| 7,542,844 | B2 | 6/2009 | Kumagai et al. | |
| 7,616,978 | B2 * | 11/2009 | Piekarz | 455/575.9 |
| 7,640,098 | B2 * | 12/2009 | Stenbock et al. | 701/528 |
| 7,688,228 | B2 * | 3/2010 | Tanizaki et al. | 340/995.12 |
| 8,055,440 | B2 * | 11/2011 | Shintani et al. | 701/420 |
| 8,155,669 | B2 * | 4/2012 | Ziskind et al. | 455/456.3 |
| 2007/0259674 | A1 * | 11/2007 | Neef et al. | 455/456.1 |
| 2008/0036586 | A1 * | 2/2008 | Ohki | 340/539.13 |
| 2008/0147304 | A1 * | 6/2008 | Pai et al. | 701/115 |
| 2008/0167937 | A1 * | 7/2008 | Coughlin et al. | 705/9 |
| 2008/0195306 | A1 * | 8/2008 | Moinzadeh et al. | 701/201 |
| 2008/0319653 | A1 * | 12/2008 | Moshfeghi | 701/208 |
| 2010/0161490 | A1 * | 6/2010 | Alrabady et al. | 705/50 |
| 2011/0018759 | A1 * | 1/2011 | Bennett et al. | 342/357.4 |

* cited by examiner

*Primary Examiner* — Hussein A. Elchanti
*Assistant Examiner* — Rami Khatib
(74) *Attorney, Agent, or Firm* — Burr & Brown

(57) ABSTRACT

A method of using airport surveillance data to determine a location of a delay and an amount of time a vehicle is subjected to the delay during a movement of the vehicle between locations including obtaining a time-ordered sequence of data points representing the movement of the vehicle, creating a speed vector (sv) for each data point, replacing ground speed elements in the speed vector (sv) with a one when the ground speed element is less than a speed threshold, performing a spatial density test on each data point in a sequence of consecutive one entries, defining a starting and stopping index for a consecutive sequence of data points as a preliminary hold, determining whether to merge adjacent preliminary holds, determining a time duration of each preliminary hold and eliminating any preliminary hold having a time duration less than a predetermined time duration and outputting the results.

20 Claims, 9 Drawing Sheets

AUTOMATIC DETERMINATION OF AIRCRAFT HOLDING LOCATIONS AND HOLDING DURATIONS FROM AIRCRAFT SURVEILLANCE DATA

CROSS-REFERENCE TO RELATED APPLICATIONS

This application is a continuation-in-part of U.S. patent application Ser. No. 13/396,938, filed Feb. 15, 2012, which is a division of U.S. patent application Ser. No. 12/325,405, filed Dec. 1, 2008, which claims the benefit of U.S. Provisional Patent Application Ser. No. 60/990,985, filed Nov. 29, 2007, the entireties of which are incorporated herein by reference.

FIELD OF THE INVENTION

The invention relates to a method and computer program that determines aircraft holding locations and holding durations on the surface of airport, as directed by air traffic controllers and followed by pilots of aircraft.

BACKGROUND OF THE INVENTION

The demands placed upon the worldwide air traffic system are changing at a rapid pace, because more aircraft are requiring the use of the same airspace and airports, placing greater demands on airport capacity. Due to energy demands and consumer requirements, commercial air carriers are increasingly utilizing smaller, more efficient aircraft in a "hub and spoke" arrangement, where a majority of flights initiate or terminate at an airport facility located near a large metropolitan area. Further, due to the fact the commercial air carriers are unable to meet the timing and convenience required by an increasing number of consumers, the air traffic system is being required to handle an increasing number of general aviation aircraft.

The increased number of flights operating from hub airports, both domestic and international, has resulted in significant air traffic congestion problems at these locations. A seemingly obvious solution to such congestion problems would be to merely acid more runways, to add more taxiways, and to acid more passenger terminals. Each of these potential solutions is fraught with problems. One such problem is that the real estate required for such additions is simply not available in many instances for additions to existing airports. For example, 468 homes adjacent to the Cleveland Hopkins Airport needed to be razed to add a third runway to that airport. Situations such as this raise the cost of adding even one new runway to inordinate levels.

Further, building entirely new airports creates significant other problems. One such problem is that an entirely new airport costs a large amount of taxpayer funds and takes a significant amount of time. For example, the new Denver International Airport cost over five billion dollars (US) and took longer than six years to complete. Another problem is that any new or proposed airport will likely be built even further from a respective metropolitan area than an existing airport, the added distance adding cost and inconvenience to most every traveler's plans.

Similarly, increasing the number of runways and passenger terminals to any airport greatly increases the complexity and time required for aircraft and passengers alike to navigate. As one can easily imagine, airports having only one runway and only one passenger terminal will require only a limited number of taxiways for the passage of aircraft to and from the passenger terminal. Also, as one can easily imagine, when the number of runways and passenger terminals is increased, the number of taxiways servicing those runways and passenger terminals exponentially creases. This increase alone comes with many problems.

Aircraft movement between a runway and a passenger terminal while on taxiways is a highly monitored activity with significant human involvement. Aircraft, regardless of their size, are built for safe and efficient travel during operation in the air. Aircraft are, however, large, ungainly land vehicles with significant visibility disabilities. Accordingly, aircraft pilots typically rely on air traffic controllers for orchestrating the guidance of their aircraft to and from runways on taxiways of large airports. As one can easily imagine, the task of individually directing the movement of a large aircraft, where the pilot is unable to see the extents of the aircraft, through a maze of taxiways is daunting task.

During times of optimal operational efficiency, air traffic controllers are able to direct aircraft along a taxi-path between an arrival/departure runway and a gate area without requiring the pilot to delay or hold at a particular location for an amount of time. These holds are caused by a variety of reasons such as the absence of available space within the passenger terminal area, that aircraft must be sequenced for arrival to a runway/passenger terminal, that the aircraft must be deiced, that there is an arrival delay at a destination airport and/or that there is overcrowding of the taxiways.

There are published holding areas that can be used as a reference for the air traffic controllers under particular circumstances, such as for deicing. It should be noted, however, that air traffic controllers often create their own holding locations for aircraft depending on their own experiences and their own interpretation of the current airport requirements. Accordingly, the holding locations used by aircraft may differ significantly from the published holding areas.

Any time an aircraft is held at a particular location increases the amount of time that the aircraft is operating while traversing the distance between the runway and the gate area. This increased amount of time beyond an ideal circumstance where the aircraft is not subjected to any holds is the holding duration. Any amount of holding duration results in substantial additional fuel costs, substantial environmental impact, and substantial additional personnel costs. For example, aircraft engines are designed to develop efficient power while operating at a high altitude. While on the ground, these engines are inefficiently used to generate electrical power for the operation of the aircraft, used to power air conditioning systems, and used to propel the aircraft. Even through these tasks can be performed more efficiently by ground based power supply units, it is nearly impossible to have an aircraft attached to a ground power supply unit while the aircraft is traversing the distance between a runway and a passenger terminal.

Further, because the aircraft engines inefficiently produce power while on the ground, the aircraft produce large amounts of carbon dioxide ($CO_2$) and other pollutants while in operation on the ground. Because of the effects that $CO_2$ may have on climate change and the effect that the other pollutants may have on the air quality surrounding the airport, any amount of time that an aircraft spends in operation on the ground causes significant environmental impacts.

SUMMARY OF THE INVENTION

The present invention helps to reduce wasted fuel, reduce environmental impacts, reduce wasted personnel time, and increase safety by concretely objectifying the holding locations and holding durations the aircraft, or other ground vehicles, as directed by the air traffic controllers. Such concrete determinations of the holding locations and holding durations will aid airport authorities to determine what, if any, changes need to be made to airport layouts and usages. Such concrete determinations will also allow air carriers to more accurately determine the time required for one of their aircraft, or other vehicles, to traverse the distance between the runway and gate areas.

According to a first aspect of the present invention there is provided a method of using airport surveillance data to determine a location of a delay and an amount of time a vehicle is subjected to the delay during a movement of the vehicle between a first location and a second location, the method comprising obtaining a time-ordered sequence of data points representing the movement of the vehicle, each data point including an (x) position coordinate and a (y) position coordinate, at a particular time represented by a time stamp, creating a speed vector (sv) including a plurality of elements, each of the elements corresponding to one of the data points from the time ordered sequence, wherein one of the elements is a ground speed element associated with the data point, and determining the ground speed elements in the speed vector (sv) that are less than a predetermined ground speed threshold or are a NaN (i.e., not a number). The method further comprises performing a spatial density test on each data point in a sequence of data points having ground speed elements that are less than the predetermined ground speed threshold, wherein the data point passes the spatial density test when a determined number of the data points within a predetermined range of a selected data point is greater than or equal to a predetermined threshold value, defining a starting index and a stopping index within the vector (sv) for each consecutive sequence of data points as a preliminary hold where each data point in the sequence having the ground speed element less than the predetermined ground speed threshold and passes the spatial density test, determining whether to merge each identified preliminary hold with an adjacent identified preliminary hold into a single preliminary hold, determining a time duration of each identified preliminary hold and eliminating any identified preliminary hold having a determined time duration of less than a predetermined time duration, and outputting and saving the identified preliminary holds onto a computer readable medium for at least one of review by an individual, production of a graphical display on a computer terminal, and production of a presentation document identifying the identified preliminary holds. In one embodiment, the predetermined time difference threshold value to merge adjacent preliminary holds is less than 20 seconds. In another embodiment, the predetermined time difference threshold value to merge adjacent preliminary holds is 10 seconds or less.

In one embodiment, the spatial test comprises selecting a predetermined number of data points that are closest to each data point in the sequence of low velocity data points identified as a preliminary hold, determining a number of the selected data points that fall within a predetermined range to each data point in the sequence of data points identified as a preliminary hold, and comparing the determined number of data points that fall within the predetermined range to each data point to a predetermined threshold value, wherein the data point passes the spatial test when the determined number of data points within the predetermined distance is greater than or equal to the predetermined threshold value.

In another embodiment of the method, the step of determining whether to merge adjacent preliminary holds comprises determining a mean XY value for each of a first identified preliminary hold and a second identified preliminary hold, where the second identified preliminary hold is adjacent to the first identified preliminary hold, determining a radial distance between the determined mean XY values for the first identified preliminary hold and the determined mean XY value for the second identified preliminary hold, and determining a time difference between an end of the first identified preliminary hold and a start of the second identified preliminary hold. The step of determining whether to merge adjacent preliminary holds further comprising comparing the determined radial distance to a predetermined radial distance threshold value, comparing the determined time difference to a predetermined time difference threshold value, and merging the first identified preliminary hold and the second identified preliminary hold into a single preliminary hold when the determined radial distance is less than the predetermined threshold value and the determined time difference is less than the predetermined threshold value. In one embodiment, to determine the appropriate number to be placed in one respective element of vector (v), a radial distance ($r_{i,j}$) between the (x) and (y) coordinates of each respective data point is calculated, using the following equation, for example, $(r_{i,j})=[(x_i-x_j)^2+(y_i-y_j)^2]^{1/2}$, where $r_{i,j}$ is the radial distance between points i and j, $x_i$ is the x coordinate of point i, $x_j$ is the x coordinate of points j, $y_i$ is the y coordinate of point i, and $y_j$ is the y coordinate of point j.

It one embodiment, the method further comprises performing a distance check when at least one of the determined radial distance is not less than the predetermined radial distance threshold value and the determined time difference is not less than the predetermined time difference threshold value, to determine whether to merge adjacent preliminary holds, the distance check comprising determining whether the determined radial distance is less than two times the predetermined radial distance threshold value. When the determined radial distance is less than two times the predetermined radial distance threshold value, the distance check further comprises determining a central mean XY value for the first identified preliminary hold and the second identified preliminary hold using the determined mean XY values for the first identified preliminary hold and the second identified preliminary hold, determining a radial distance from the determined central mean XY value to each point after the first identified preliminary hold and before the second identified preliminary hold, determining whether a number of points within a predetermined distance of the determined central mean is greater than a predetermined threshold value, and merging the first identified preliminary hold and a second identified preliminary hold into a single preliminary hold when the number of points within the predetermined distance of the determined central mean is greater than a predetermined value. In one embodiment, the predetermined threshold value is at least 80% of the points after the first preliminary hold and before the second preliminary hold.

In one embodiment, the method further comprises determining whether to merge the single preliminary hold with another adjacent preliminary hold and when the another adjacent preliminary hold merges with the single preliminary hold continuing to determine whether to merge other adjacent preliminary holds with the single preliminary hold until at least one of the following conditions are met: (i) one of the other adjacent preliminary holds does not merge with the single preliminary hold and/or (ii) there are no more adjacent preliminary holds to determine whether to merge with the single preliminary hold. In another embodiment, the method further comprises determining whether to merge two adjacent preliminary holds that are later in time and where the two adjacent preliminary holds merge into another single preliminary hold, continuing to determine whether to merge subsequent adjacent preliminary holds with the another single preliminary hold until at least one of the following conditions are met: (i) one of the subsequent adjacent preliminary hold does not merge with the another single preliminary hold, or (ii) there are no more adjacent preliminary holds to merge with the another single preliminary hold.

In one embodiment, the predetermined ground speed threshold is not more than 5 knots. In another embodiment, the predetermined ground speed threshold is 3.5 knots or less.

In one embodiment, the predetermined time duration for maintaining an identified preliminary hold is at least 5 seconds. In another embodiment, the predetermined time duration for maintaining an identified preliminary hold is 10 seconds or more.

In one embodiment, the predetermined threshold value in the spatial density test is at least 30 data points falling within the predetermined range. In another embodiment, the predetermined threshold value in the spatial density test is at least 40 data points falling within the predetermined range. In one embodiment, the selected predetermined number of data points is not more than 300 data points. In another embodiment, the selected predetermined number of data points is not more than 100 data points.

In one embodiment, the predetermined radial distance threshold is not more than 20 meters. In another embodiment, the predetermined radial distance threshold is 10 meters or less.

According to a second aspect of the present invention there is provided a method of using airport surveillance data to determine a location of a delay and an amount of time a vehicle is subjected to the delay during a movement of the vehicle between a first location and a second location, the method comprising obtaining a time-ordered sequence of data points representing the movement of the vehicle, each data point including an (x) position coordinate and a (y) position coordinate, at a particular time represented by a time stamp, creating a speed vector (sv) including a plurality of elements, each of the elements corresponding to one of the data points from the time ordered sequence, wherein one of the elements is a ground speed element associated with the data point, and replacing the ground speed elements in the speed vector (sv) with one of a zero (0) entry and a one (1) entry, the one (1) entry designating that the ground speed element is less than the predetermined ground speed threshold or is a NaN, and the zero (0) entry designating that the ground speed is equal to or greater than the predetermined ground speed threshold and the ground speed value is not a NaN. The method further comprises performing a spatial density test on each data point in a sequence of data points having consecutive one (1) entries for the ground speed element, wherein the data point passes the spatial density test when a determined number of the data points within a predetermined range of a selected data point is greater than or equal to a predetermined threshold value, defining a starting index and a stopping index within the vector (sv) for each consecutive sequence of data points as a preliminary hold where each data point in the sequence has a one (1) entry for the ground speed element and passes the spatial density test, determining whether to merge each identified preliminary hold with an adjacent identified preliminary hold into a single preliminary hold, determining a time duration of each identified preliminary hold and eliminating any identified preliminary hold having a determined time duration of less than a predetermined time duration, and outputting and saving the identified preliminary holds onto a computer readable medium for at least one of review by an individual, production of a graphical display on a computer terminal, and production of a presentation document identifying the identified preliminary holds.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

While it should be understood that the present invention can be used to analyze the movement of all types of vehicles, the present invention will be more fully discussed below with reference to aircraft.

Figure 1:
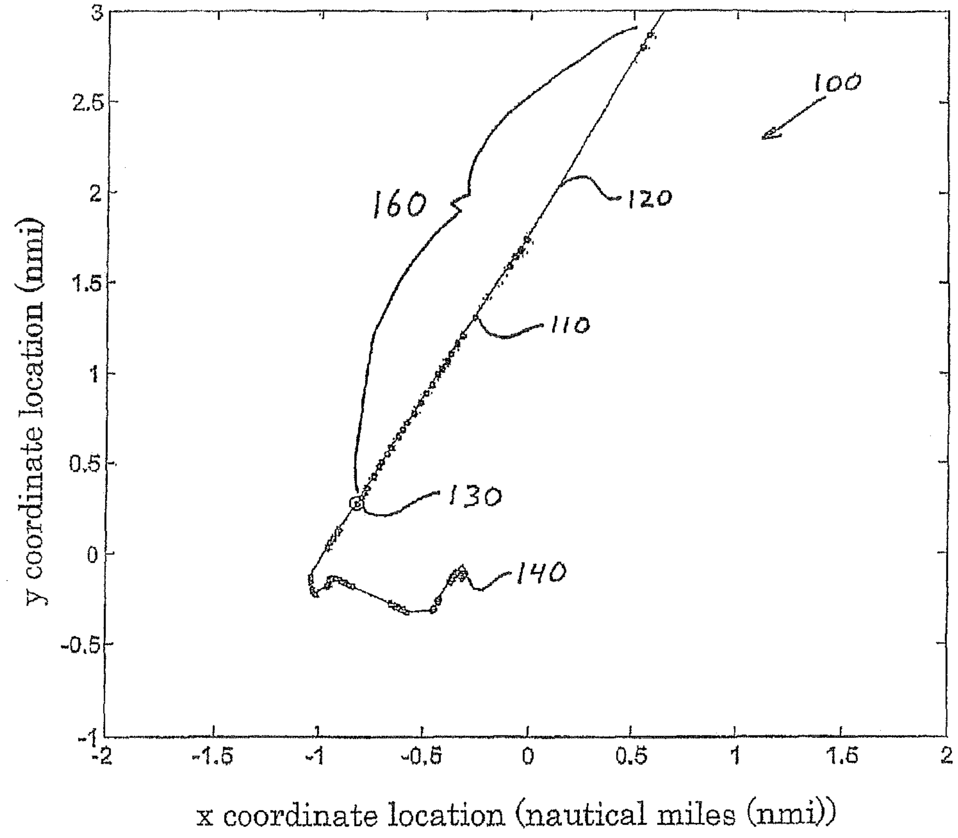
FIG. 1 is a Cartesian plot of data points representing the movement of an aircraft including the aircraft's path from the arrival to the airport area to the passenger terminal area.

Based on the assumption that holding aircraft will have a low ground speed, the holding algorithm of the present invention identifies surveillance data points that have low ground speed. The holding algorithm is a software program operating on a computer with interfaces to one or more airport ground surveillance systems for receiving position data for each aircraft on a surface, such as an airport. The computer has sufficient processing capability to receive position data updates from each of the one or more airport ground surveillance systems. A sequence 100 of individual data points 110 is shown in FIG. 1. Each data point 110 includes at least an (x) position coordinate and a (y) position coordinate as plotted on the Cartesian plane. Each data point 110 also has a sequential time stamp that is not shown. As is well known in the art, the time stamp can take any form such as Coordinated Universal Time (UTC), local time, or a basic incrementing counter. These data points 110 are collected for aircraft in and around an airport environment using airport surveillance equipment that utilizes techniques such as, multilateration based on ATCRBS, automatic dependent surveillance-broadcast (ADS-B), on-board GPS position tracking, etc.

In a typical arrival, as shown in FIG. 1, data points 110 are collected showing a path 120 of an aircraft during its final approach 160 and during its taxi between a wheels-on event 130, which is typically a point during the aircraft's landing roll-out, and a gate-in event 140, which is a point where the aircraft is considered to be at a passenger terminal or other final destination on the airport. It should be understood that the destination may be an intermediate destination, such as a transition area between airport ground control and gate ground control. Based on the received position data updates from each of the one or more airport ground surveillance systems, the holding algorithm identifies aircraft having a ground speed that is less than a predetermined ground speed threshold value (i.e., low ground speed).

It should be understood that for the purpose of the remaining disclosure, an aircraft being analyzed using the methods described herein can be passing from the on event 130 to the in event 140 or vice versa. The direction that the aircraft travels is not significant to the determination of associated holding locations and holding durations.

A time-ordered sequence of individual data points 110 for a given aircraft path will not precisely follow the exact location of the aircraft. In particular, due to expected positional errors in the information provided by the airport surveillance equipment, an aircraft at rest may still show random movement, which creates a displayed path that may have areas that have the appearance of a knot. Because each of these knot areas is an indicator of an aircraft holding in a particular location for a duration of time, the method described more fully below seeks to accurately identify these particular locations and durations of holding without mischaracterizing two separate knots as being a larger single knot.

After obtaining the time-ordered sequence of data points 110, the next step is to create speed vector (sv) using information derived from the individual data points 110. Each element in the vector corresponds to one of the respective data points 110. For example, because there are seventy-five data points 110 present in sequence, there will be seventy five entries in the speed vector (sv), as is represented below in Table 1.

The next step is to perform a spatial density test on (i) each data point flagged for having a ground speed less than the predetermined ground speed, or (ii) each data point in a sequence of data points having consecutive one (1) entries for the ground speed elements. In one embodiment of the method of the present invention shown in FIG. 4, the spatial test includes selecting a predetermined number of data points that are closest to each data point in the sequence of data points identified as a preliminary hold, determining a number of the selected data points that fall within a predetermined range of each data point in the sequence of data points identified as a preliminary hold, and comparing the determined number of the selected data points that fall within the predetermined range to a predetermined threshold value, wherein the data point passes the spatial test when the determined number of the selected data points is greater than or equal to the predetermined threshold value. The selected data point passes the spatial density test when a determined number of the data points within a predetermined range of a selected data point is greater than or equal to a predetermined threshold value. One example of the spatial density test is discussed in greater detail later in this specification.

Figure 2:
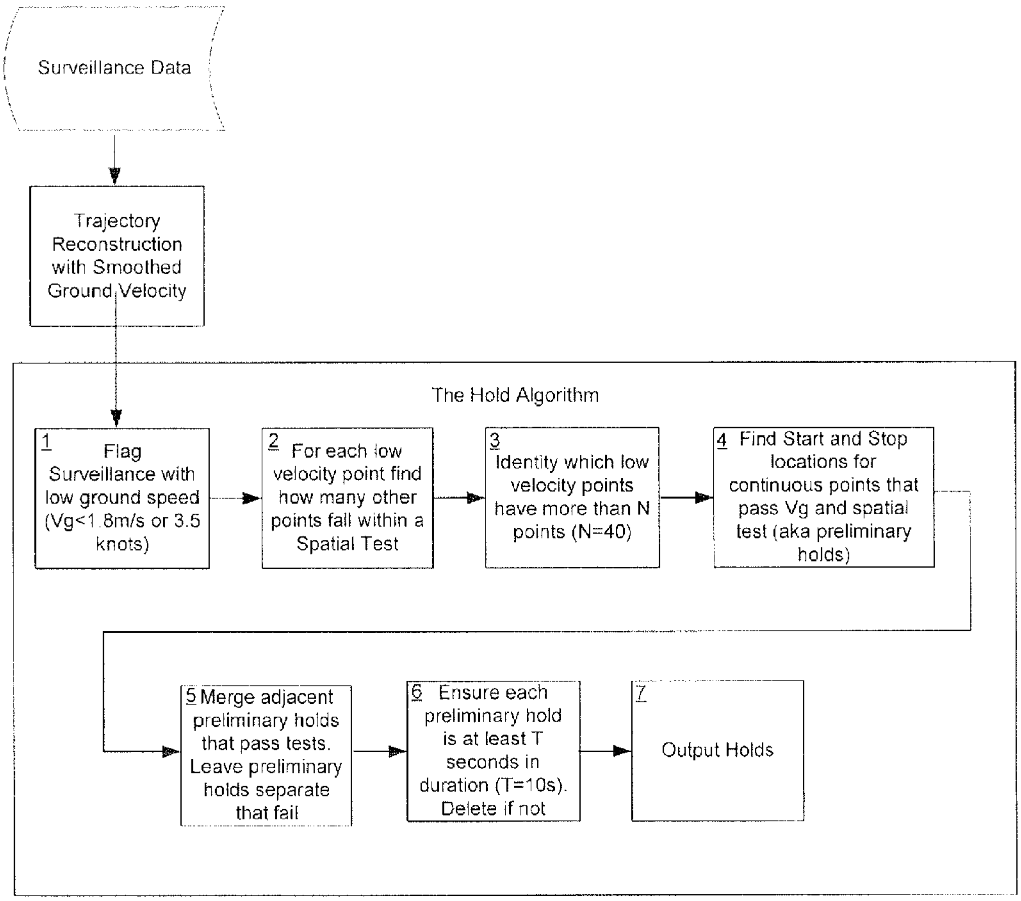
FIG. 2 illustrates one example of the hold merging algorithm processing of the present invention.

As shown in FIG. 2, the next step is to define a start index and a stop index within the vector (sv) for each consecutive sequence of data points as a preliminary hold where (i) each data point flagged for having a ground speed less than the predetermined ground speed and passes the spatial density test, or (ii) each data point in the sequence has a one (1) entry for the ground speed element and passes the spatial density test.

TABLE 1

Sequence 200 Including an Unpopulated Vector (v)

| Data point (Index) | Location | Time Stamp | Speed Vector (sv) |
|---|---|---|---|
| 1 | (x) and (y) Coordinate Data Point 1 | Time at Location 1 | |
| 2 | (x) and (y) Coordinate Data Point 1 | Time at Location 2 | |
| 3 | (x) and (y) Coordinate Data Point 1 | Time at Location 3 | |
| 4 | (x) and (y) Coordinate Data Point 1 | Time at Location 4 | |
| 5 | (x) and (y) Coordinate Data Point 1 | Time at Location 5 | |
| . . . | . . . | . . . | . . . |
| 70 | (x) and (y) Coordinate Data Point 1 | Time at Location 6 | |
| 71 | (x) and (y) Coordinate Data Point 1 | Time at Location 7 | |
| 72 | (x) and (y) Coordinate Data Point 1 | Time at Location 8 | |
| 73 | (x) and (y) Coordinate Data Point 1 | Time at Location 9 | |
| 74 | (x) and (y) Coordinate Data Point 1 | Time at Location 10 | |
| 75 | (x) and (y) Coordinate Data Point 1 | Time at Location 11 | |

The next step is to determine the estimated ground speed of the aircraft at each data point 110 using any of the many methods well known in the art, and entering the estimated ground speed into the vector (sv). It should be understood that the ground speed can be one of the pieces of information provided with each data point 110 and/or can be estimated using the locations of the data points 110 in relation to the time stamps.

In one embodiment, shown in FIG. 2, each of the data points determined to have a ground speed less than the predetermined ground speed are then flagged. In another embodiment, the next step is to replace the ground speed elements in the speed vector (sv) with one of a zero (0) entry and a one (1) entry. The one (1) entry is entered when the ground speed element is less than the predetermined ground speed threshold or is a NaN, and the zero (0) entry is entered when the ground speed is equal to or greater than the predetermined ground speed threshold and the ground speed value is not a NaN.

The next step is to determine whether to merge adjacent identified preliminary holds into a single preliminary hold. In one embodiment shown in FIG. 6, the step of determining whether to merge adjacent preliminary holds includes determining a mean XY value for the first identified preliminary hold and a mean XY value for the second identified preliminary hold and determining a radial distance between the determined mean XY values for the first identified preliminary hold and the determined mean XY value for the second identified preliminary hold. In one embodiment, the radial distance is calculated using the following equation:

$$(r_{i,j})=[(x_i-x_j)^2+(y_i-y_j)^2]^{1/2}$$

where:

$r_{i,j}$ is the radial distance between points i and j;

$x_i$ is the x coordinate of point i;

$x_j$ is the x coordinate of points j;

$y_i$ is the y coordinate of point i; and $y_j$ is the y coordinate of point j.

Next, a time difference between an end of one identified preliminary hold and the start of the later occurring identified preliminary hold is determined, Then the determined radial distance is compared to a predetermined radial distance threshold value, and the determined time difference is compared to a predetermined time difference threshold value, and the adjacent identified preliminary holds are merged into a single preliminary hold when the determined radial distance is less than the predetermined threshold value and the determined time difference is less than the predetermined threshold value. One example of the merge decision algorithm is discussed in greater detail later in this specification.

If the adjacent preliminary holds do not pass the time and distance merge criteria discussed above, in some embodiments, a second distance only test is performed when the radial distance is more than the distance threshold value but less than 2 times the distance threshold value. In one embodiment, the second test determines a central mean XY for the first and second identified preliminary holds using the determined mean XY for the first identified preliminary hold and the determined mean XY for the second identified preliminary hold. The merge decision algorithm then calculates a radial distance from the central mean XY to all of the points that are between the first identified preliminary hold and the second identified preliminary hold. The merge decision algorithm then determines the percentage of the data points between the first identified preliminary hold and the second identified preliminary hold that are within two (2) times the distance threshold value. If the number of data points within the two (2) times the distance threshold value is at least a predetermined percentage of all of the points that are between the first identified preliminary hold and the second identified preliminary hold, the merge algorithm merges the two identified preliminary holds. In one embodiment, the predetermined percentage is at least 80%. If the number of data points within the two (2) times the distance threshold value is less than a predetermined percentage of all of the points that are between the first identified preliminary hold and the second identified preliminary hold, the merge algorithm does not merge the two identified preliminary holds and keeps each of the identified preliminary holds as a separate identified hold for subsequent processing.

The next step is to determine a time duration of each identified preliminary hold and eliminate any identified preliminary hold having a determined time duration of less than a predetermined time duration. In one embodiment, the predetermined time duration for maintaining an identified preliminary hold is at least 5 seconds. In another embodiment, the predetermined time duration for maintaining an identified preliminary hold is 10 seconds or more. In yet another embodiment, the predetermined time duration for maintaining an identified preliminary hold is 60 seconds or less.

The data points identified are then output and saved onto a computer readable medium for at least one of: review by an individual, production of a graphical display on a computer terminal, and production of a presentation document identifying the identified preliminary holds.

FIG. 2 depicts one embodiment of the preliminary hold merging algorithm processing of the present invention. Each of the steps shown in FIG. 2 is discussed in more detail in the following paragraphs.

Spatial Density Test

Figure 3:
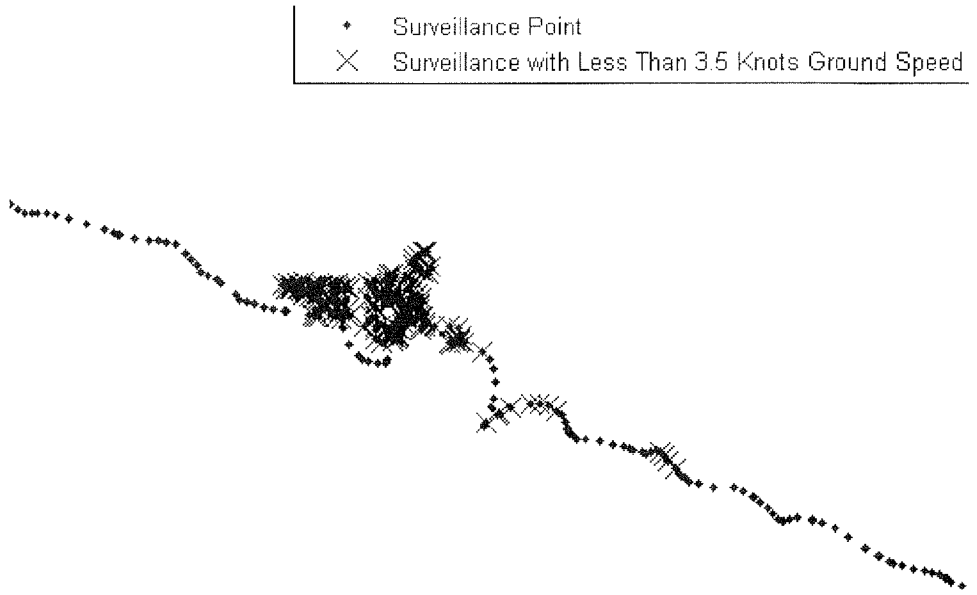
FIG. 3 shows an example of determined ground speeds for data points based on surveillance data.

FIG. 3 illustrates a typical surveillance data for track taxing to/from a gate (direction does not matter). In FIG. 3, all surveillance data points with a determined ground speed greater than a threshold value (in this example 3.5 knots) are shown with a ♦ symbol, while all surveillance points with a determined ground speed that is less than the threshold value are shown with an x symbol.

For each low ground speed surveillance point shown with an x symbol in FIG. 3, a spatial test is executed in step 2 to determine the number of surrounding points for a given area surrounding that surveillance point as defined by a spatial filter. The hold algorithm identifies low ground speed surveillance updates that have at least N number of other surrounding points within a predetermined distance range that is defined in the spatial test. The spatial test identifies clusters of data points that should be flagged as preliminary holds. The spatial test operates on all surveillance data points that have been flagged as low ground speed (specifically less than 3.5 knots) using the processing steps shown in FIG. 4.

Figure 4:
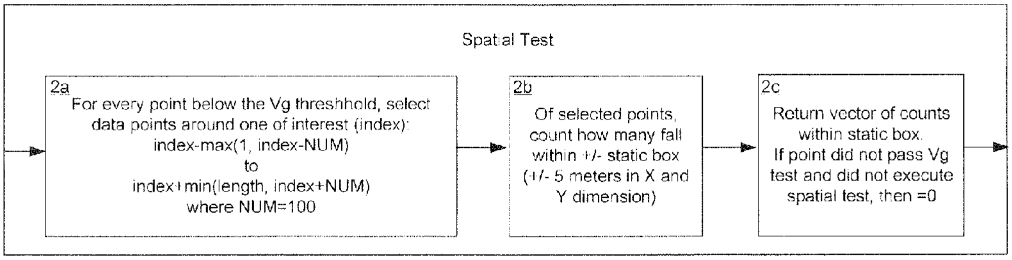
FIG. 4 shows an example of a spatial test functional block diagram of one embodiment of the present invention.

As shown in step 2*a* of FIG. 4, the spatial test filters the data points down in a coarse method based upon a sliding window of up to +/−100 surveillance points about the point of interest. This filtered data is then fine-filtered to find all of the surveillance points that fall within a static box of +/−5 meters (step 2*b*). The count for the number of points that pass both of these filters is output for each low ground speed data surveillance point (step 2*c*).

Figure 5:
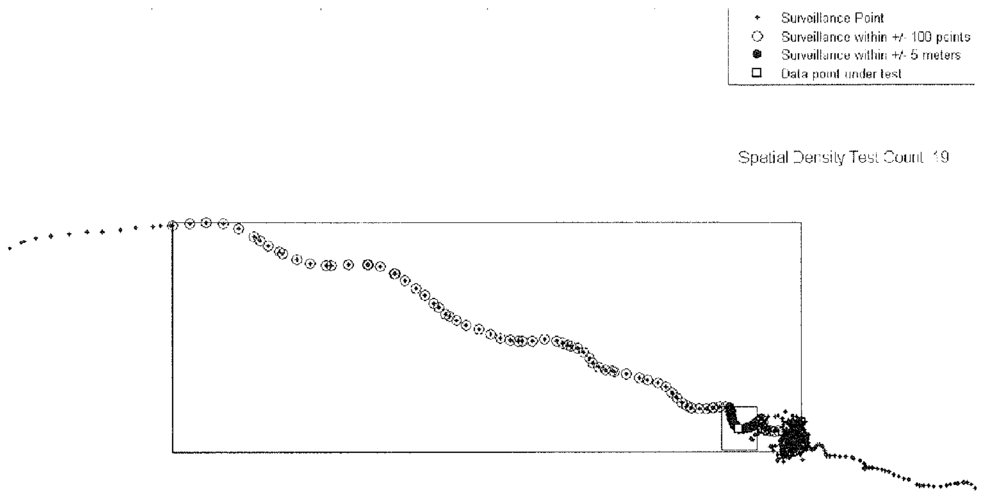
FIG. 5 shows a plot for determining a spatial test of the example.

FIG. 5 illustrates how a count is determined for each low ground speed surveillance data point in this embodiment of the present invention. First, a window of data points is selected containing data before and after the data point being examined. These surrounding points are illustrated in FIG. 5 as circled data points that fall within the outer box. In the example given, the number of data points is +/−100 about the data point of interest. This number can be +/−300 data points about the data point of interest. This number can be less than 100 if there is less data available (i.e., surveillance data points 1 to 99 and the last 100 data points of the track). Of those selected coarse filtered data points, an additional box is drawn around the surveillance data point of interest. This box uses the surveillance data points' XY position +/−5 meters in X and Y components, which is illustrated as the inner box in FIG. 5. The number of data points that fall within both of these boxes is the count output for this particular data point spatial test (labeled Spatial Test Result in Table 2). In the example shown in Table 2, the exceeds N threshold flag value is 40.

TABLE 2

| Surveillance Update | X (m) | Y (m) | Time (Matlab datenum) | Ground Speed GS (m/s) | GS Thresh Flag | Spatial Test Result | Exceeds N Thresh Flag | Notes |
|---|---|---|---|---|---|---|---|---|
| . . . | | | | | | | | |
| 390 | −251.01 | 1034.11 | 734289.939053 | 0.90628 | 1 | 37 | 0 | Low Velocity Only |
| 391 | −251.39 | 1033.37 | 734289.939067 | 0.58966 | 1 | 30 | 0 | Low Velocity Only |
| 392 | −251.48 | 1034.44 | 734289.939078 | 0.4629 | 1 | 42 | 1 | Start Preliminary Hold 1 |

TABLE 2-continued

| Surveillance Update | X (m) | Y (m) | Time (Matlab datenum) | Ground Speed GS (m/s) | GS Thresh Flag | Spatial Test Result | Exceeds N Thresh Flag | Notes |
|---|---|---|---|---|---|---|---|---|
| 393 | −251.65 | 1035.16 | 734289.939090 | 0.22693 | 1 | 48 | 1 | |
| 394 | −250.96 | 1035.68 | 734289.939101 | 0.17595 | 1 | 64 | 1 | |
| 395 | −250.19 | 1036.16 | 734289.939110 | 0.23487 | 1 | 73 | 1 | |
| 396 | −249.78 | 1035.74 | 734289.939116 | 0.35065 | 1 | 68 | 1 | |
| 397 | −249.23 | 1035.93 | 734289.939124 | 0.63336 | 1 | 72 | 1 | End Preliminary Hold 1 |
| 398 | −247.54 | 1038.38 | 734289.939144 | 1.81163 | 0 | 0 | 0 | |
| 399 | −245.8 | 1044.12 | 734289.939157 | 1.98032 | 0 | 0 | 0 | |
| 400 | −244.71 | 1049.04 | 734289.939179 | 2.06526 | 0 | 0 | 0 | |
| 401 | −248.25 | 1040.52 | 734289.939204 | 1.26062 | 1 | 157 | 1 | Start Preliminary Hold 2 |
| 402 | −249.6 | 1036.14 | 734289.939216 | 0.35367 | 1 | 74 | 1 | |
| 403 | −249.19 | 1035.41 | 734289.939230 | 0.31219 | 1 | 61 | 1 | |
| 404 | −249.02 | 1035.11 | 734289.939237 | 0.59067 | 1 | 50 | 1 | |
| 405 | −249.31 | 1034.52 | 734289.939242 | 0.64405 | 1 | 46 | 1 | |
| 406 | −250.18 | 1033.81 | 734289.939260 | 0.63884 | 1 | 42 | 1 | |
| 407 | −250.33 | 1033.75 | 734289.939263 | 0.62741 | 1 | 42 | 1 | |
| 408 | −249.57 | 1037.06 | 734289.939277 | 1.09145 | 1 | 103 | 1 | End Preliminary Hold 2 |
| 409 | −246.44 | 1047.28 | 734289.939303 | 2.47151 | 0 | 0 | 0 | |
| . . . | | | | | | | | |

Preliminary Hold Merging

Figure 6:
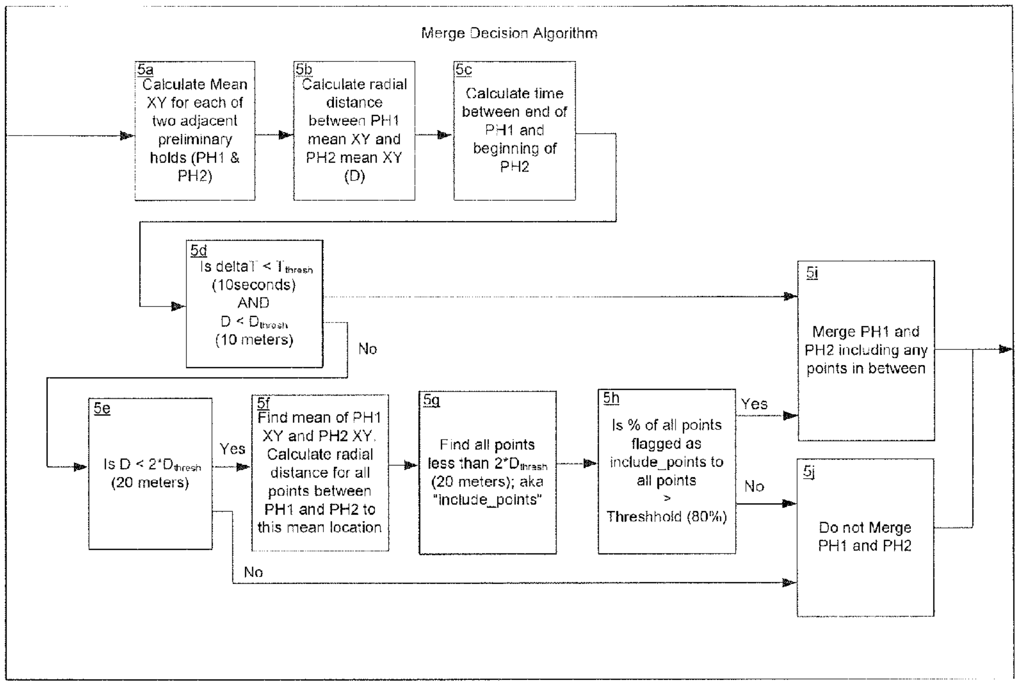
FIG. 6 illustrates a merge decision algorithm functional block diagram of one embodiment of the present invention.

The following paragraphs outline the mathematical and logical steps performed when determining whether two adjacent holds should be merged into a single hold, or left as separate independent holds in this embodiment of the present invention, as shown in FIG. 6.

The preliminary hold algorithm inspects each set of adjacent holds (in this example identified preliminary hold 1 (PH1) and identified preliminary hold 2 (PH2)) to determine whether the adjacent holds should be merged.

As shown in FIG. 6, a mean XY position is calculated for each PH1 and PH2 in step 5*a*, and then a radial distance between those two mean centers is calculated in step 5*b*. The time between the end of the PH1 and the start of PH2 is then calculated in step 5*c*. The hold algorithm uses the calculated time value and calculated radial distance between PH1 and PH2 to determine whether the calculated time and calculated radial distance satisfy (pass) the merge criteria threshold values in step 5*d*. If the merge criteria threshold values are met or exceeded, the adjacent holds along with all data points in between them are merged in step 5*i*.

If the adjacent holds do not pass both the time and distance duration tests, a second check is executed to test for merging based solely on distance, as shown in steps 5*e* through 5*h* of FIG. 6. If the merge criteria are met, the adjacent holds along with all data points in between the adjacent holds are merged as shown in step 5*i*. If the adjacent preliminary holds fail this distance only check, the adjacent preliminary holds are output as two individual preliminary holds in step 5*i*.

Figure 7:
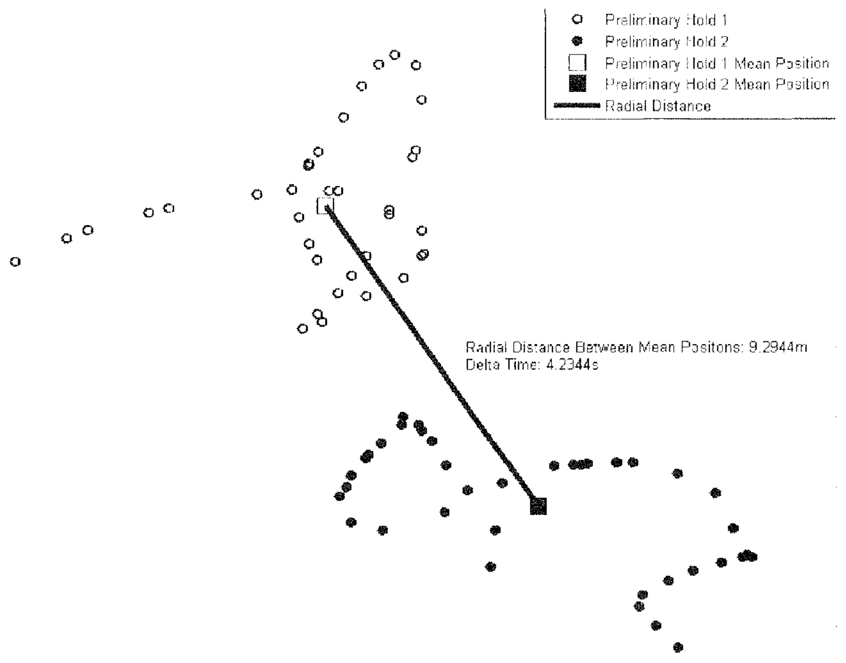
FIG. 7 shows a plot for a time and distance merging of the example.

For example, FIG. 7 illustrates an example of this time and distance check. Two preliminary holds are shown that are adjacent to one another. The black squares represent the mean XY position for each preliminary hold. The radial distance between the set mean XY pair is 9.2944 meters. The time from the last data point in PH1 to the first data point in PH2 is 4.2344 seconds. Both the time and distance between the preliminary holds are within the merge criteria in the example (10 meters and 10 seconds respectively); therefore these two preliminary holds are merged into a single preliminary hold in steps 5*d*-5*i*.

For adjacent preliminary holds that do not pass the time and distance merge criteria, a second test is performed if the radial distance between the two mean XY positions is less than 2 times the distance threshold in step 5*e*. If the radial distance is greater than 2 times the distance threshold, then the adjacent preliminary holds are not merged in step 5*i*.

Figure 8:
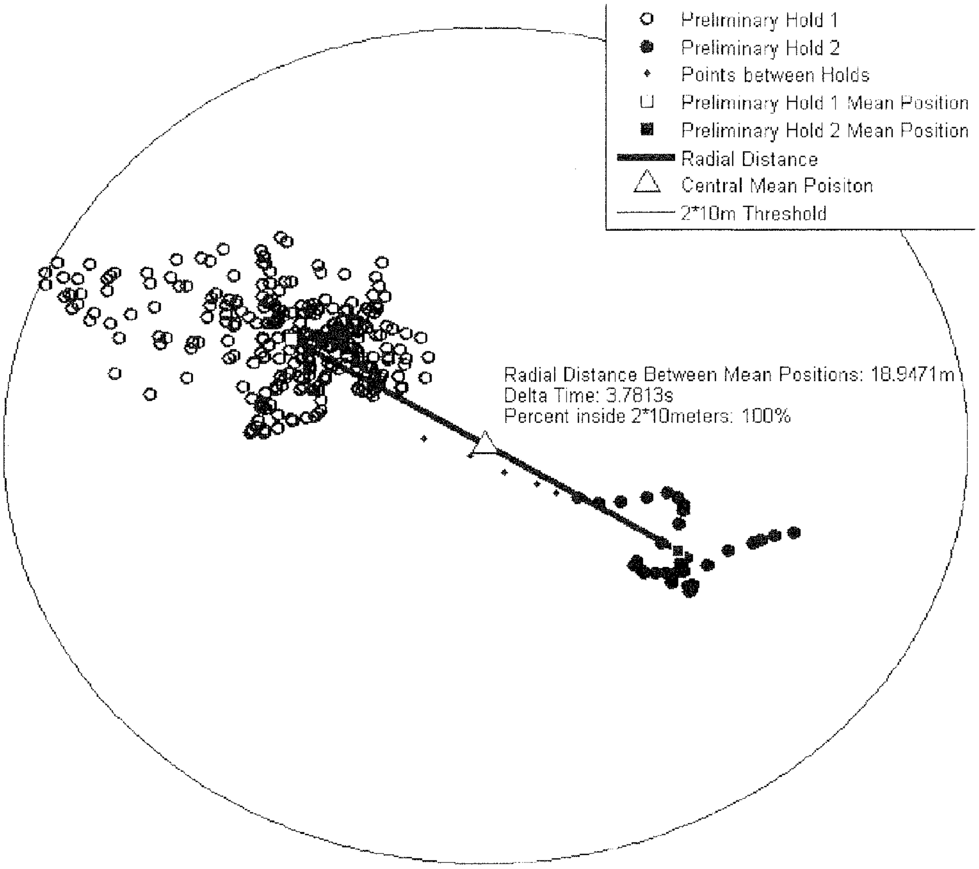
FIG. 8 illustrates an example of adjacent preliminary holds passing a distance only merging.
Figure 9:
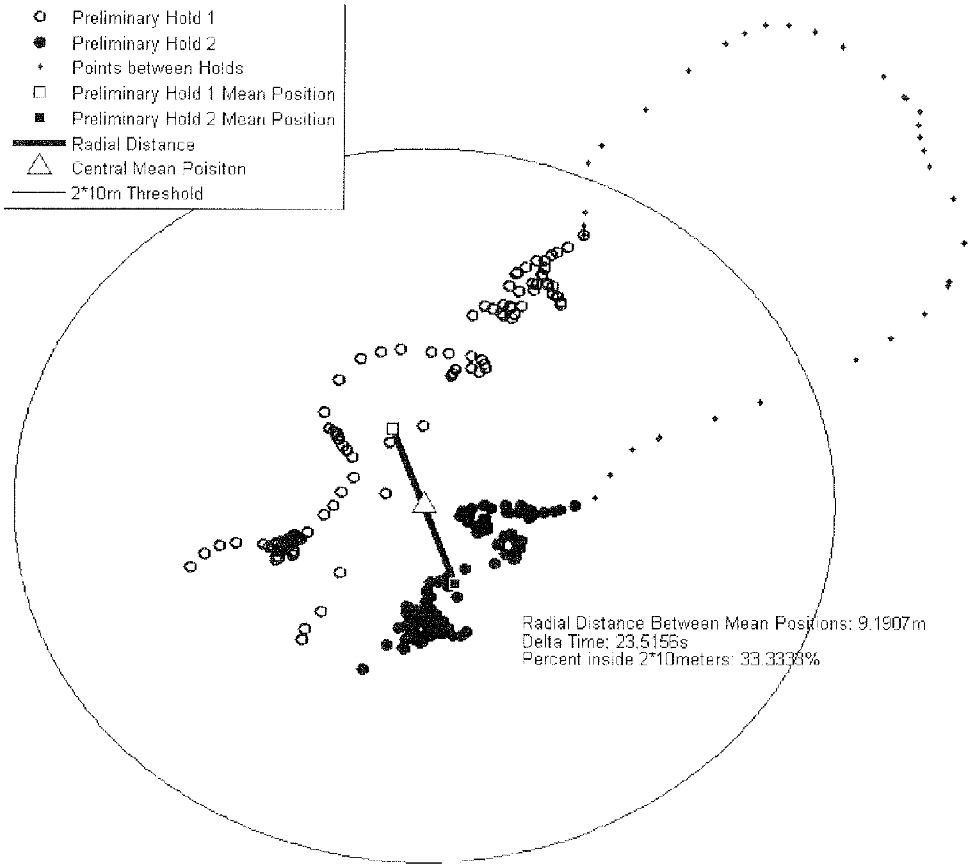
FIG. 9 illustrates an example of adjacent preliminary holds failing a distance only merging.

This second test finds a central mean XY for both preliminary holds (shown as a square box in FIGS. 8 and 9 by taking the mean of PH1 XY and PH2 XY mean positions (shown in black boxes in center of data points). The merge decision algorithm then calculates the radial distance for all data points in between PH1 and PH2 (shown as the color black) to this central mean position in step 5*f*. The radial distance is calculated using the following equation:

$$(r_{i,j})=[(x_i-x_j)^2+(y_i-y_j)^2]^{1/2}$$

where:

$r_{i,j}$ is the radial distance between points i and j;

$x_i$ is the x coordinate of point i;

$x_j$ is the x coordinate of points j;

$y_i$ is the y coordinate of point i; and $y_j$ is the y coordinate of point j.

Using this radial distance, the merge decision algorithm determine the percentage of data points that are within a two (2) times the distance threshold used previously in step 5*g*), shown as the large circle in FIG. 9. If the number of data points are within the extended distance threshold (i.e., in this example at least 80% of data points between PH1 and PH2), the two identified preliminary holds are merged in step 5*h*. In this example, FIG. 8 illustrates an example where the two preliminary holds are merged due to all of the data points in between the two identified preliminary holds falling within the extended distance threshold (i.e., the large circle).

If the number of data points that fall within the extended distance threshold are less than a given threshold (i.e., less than 80% of data points between PH1 and PH2), the two identified preliminary holds are not merged in step 5*i*. FIG. 9 illustrates an example where the two identified preliminary holds are not merged due to less than 80% of the data points in between the two identified preliminary holds falling within the extended distance threshold (i.e., the large circle). With a time gap of 23.5156 seconds it may be assumed that the aircraft held in the PH1 position, maneuvered, then returned to a similar hold location.

The merging of two identified preliminary holds result in a single preliminary hold that starts at the beginning of PH1 and ends at the end of PH2 (surveillance data points 390 to 408 in Table 2 including all points that are found in between the merged holds (i.e., surveillance data points 398 to 400 in Table 2). Following a merger of two adjacent preliminary holds, the next adjacent preliminary hold is examined to see if it too should be merged with the previous preliminary hold. This is repeated until the merge criteria are no longer met or there are no additional preliminary holds to be merged.

While the present invention has been particularly shown and described with reference to the preferred mode as illustrated in the drawings, it will be understood by one skilled in the art that various changes may be effected therein without departing from the spirit and the scope of the invention as defined by the claims.

What is claimed is:

1. A method of using airport surveillance data to determine a location of a delay and an amount of time a vehicle is subjected to the delay during a movement of the vehicle between a first location and a second location, the method comprising:

obtaining a time-ordered sequence of data points representing the movement of the vehicle, each data point including an (x) position coordinate and a (y) position coordinate, at a particular time represented by a time stamp;

creating a speed vector (sv) including a plurality of elements, each of the elements corresponding to one of the data points from the time ordered sequence, wherein one of the elements is a ground speed element associated with the data point;

determining the ground speed elements in the speed vector (sv) that are less than a predetermined ground speed threshold or are not a number;

performing a spatial density test on each data point in a sequence of data points having ground speed elements that are less than the predetermined ground speed threshold, wherein the data point passes the spatial density test when a determined number of the data points within a predetermined range of a selected data point is greater than or equal to a predetermined threshold value;

defining a starting index and a stopping index within the vector (sv) for each consecutive sequence of data points as a preliminary hold where each data point in the sequence has a ground speed element that is less than the predetermined speed threshold and passes the spatial density test;

determining whether to merge each identified preliminary hold with an adjacent identified preliminary hold into a single preliminary hold;

determining a time duration of each identified preliminary hold and eliminating any identified preliminary hold having a determined time duration of less than a predetermined time duration; and outputting and saving the identified preliminary holds onto a computer readable medium for at least one of review by an individual, production of a graphical display on a computer terminal, and production of a presentation document identifying the identified preliminary holds.

2. The method of claim 1, wherein the spatial test comprises:

selecting a predetermined number of data points that are closest to each data point in the sequence of data points identified as a preliminary hold;

determining a number of the selected data points that fall within a predetermined range to each data point in the sequence of data points identified as a preliminary hold; and comparing the determined number of data points that fall within the predetermined range to each data point to a predetermined threshold value, wherein the data point passes the spatial test when the determined number of data points within the predetermined distance is greater than or equal to the predetermined threshold value.

3. The method of claim 2, wherein the selected predetermined number of data points is not more than 300 data points.

4. The method of claim 3, wherein the selected predetermined number of data points is not more than 100 data points.

5. The method of claim 1, wherein determining whether to merge adjacent preliminary holds comprises:

determining a mean XY value for each of a first identified preliminary hold and a second identified preliminary hold, where the second identified preliminary hold is adjacent to the first identified preliminary hold;

determining a radial distance between the determined mean XY values for the first identified preliminary hold and the determined mean XY value for the second identified preliminary hold;

determining a time difference between an end of the first identified preliminary hold and a start of the second identified preliminary hold;

comparing the determined radial distance to a predetermined radial distance threshold value;

comparing the determined time difference to a predetermined time difference threshold value; and merging the first identified preliminary hold and the second identified preliminary hold into a single preliminary hold when the determined radial distance is less than the predetermined threshold value and the determined time difference is less than the predetermined threshold value.

6. The method of claim 5, further comprising performing a distance check when at least one of the determined radial distance is not less than the predetermined radial distance threshold value and the determined time difference is not less than the predetermined time difference threshold value, to determine whether to merge adjacent preliminary holds, the distance check comprising:

determining whether the determined radial distance is less than two times the predetermined radial distance threshold value, and when the determined radial distance is less than two times the predetermined radial distance threshold value:

determining a central mean XY value for the first identified preliminary hold and the second identified preliminary hold using the determined mean XY values for the first identified preliminary hold and the second identified preliminary hold;

determining a radial distance from the determined central mean XY value to each point after the first identified preliminary hold and before the second identified preliminary hold;

determining whether a number of points within a predetermined distance of the determined central mean is greater than a predetermined threshold value; and merging the first identified preliminary hold and a second identified preliminary hold into a single preliminary hold when the number of points within the predetermined distance of the determined central mean is greater than a predetermined value.

7. The method of claim 6, further comprising determining whether to merge the single preliminary hold with another adjacent preliminary hold and when the another adjacent preliminary hold merges with the single preliminary hold, continuing to determine whether to merge other adjacent preliminary holds with the single preliminary hold until at least one of the following conditions are met (i) the other adjacent preliminary hold does not merge with the single preliminary hold and (ii) there are no more adjacent preliminary holds to determine whether to merge.

8. The method of claim 7, further comprising determining whether to merge two adjacent preliminary holds later in time and where the two adjacent preliminary holds merge into another single preliminary hold, continuing to determine whether to merge adjacent preliminary holds with the another single preliminary hold until at least one of the following conditions are met (i) the another adjacent holds does not merge with the another single preliminary hold and (ii) there are no more preliminary holds to merge.

9. The method of claim 6, wherein the predetermined threshold value is at least 80%.

10. The method of claim 5, wherein the predetermined radial distance threshold is not more than 20 meters.

11. The method of claim 10, wherein the predetermined radial distance threshold is 10 meters or less.

12. The method of claim 5, wherein the predetermined time difference threshold value to merge adjacent preliminary holds is less than 20 seconds.

13. The method of claim 12, wherein the predetermined time difference threshold value to merge adjacent preliminary holds is 10 seconds or less.

14. The method of claim 1, wherein the predetermined ground speed threshold is not more than 5 knots.

15. The method of claim 14, wherein the predetermined ground speed threshold is 3.5 knots or less.

16. The method of claim 1, wherein the predetermined time duration for maintaining an identified preliminary hold is at least 5 seconds.

17. The method of claim 16, wherein the predetermined time duration for maintaining an identified preliminary hold is 10 seconds or more.

18. The method of claim 1, wherein the predetermined threshold value in the spatial density test is at least 30 data points falling within the predetermined range.

19. The method of claim 18, wherein the predetermined threshold value in the spatial density test is at least 40 data points falling within the predetermined range.

20. A method of using airport surveillance data to determine a location of a delay and an amount of time a vehicle is subjected to the delay during a movement of the vehicle between a first location and a second location, the method comprising:

obtaining a time-ordered sequence of data points representing the movement of the vehicle, each data point including an (x) position coordinate and a (y) position coordinate, at a particular time represented by a time stamp;

creating a speed vector (sv) including a plurality of elements, each of the elements corresponding to one of the data points from the time ordered sequence, wherein one of the elements is a ground speed element associated with the data point;

replacing the ground speed elements in the speed vector (sv) with one of a zero (0) entry and a one (1) entry, the one (1) entry designating that the ground speed element is less than the predetermined ground speed threshold or is not a number, and the zero (0) entry designating that the ground speed is equal to or greater than the predetermined ground speed threshold and the ground speed value is a number;

performing a spatial density test on each data point in a sequence of data points having consecutive one (1) entries for the ground speed element, wherein the data point passes the spatial density test when a determined number of the data points within a predetermined range of a selected data point is greater than or equal to a predetermined threshold value;

defining a starting index and a stopping index within the vector (sv) for each consecutive sequence of data points as a preliminary hold where each data point in the sequence has a one (1) entry for the ground speed element and passes the spatial density test;

determining whether to merge each identified preliminary hold with an adjacent identified preliminary hold into a single preliminary hold;

determining a time duration of each identified preliminary hold and eliminating any identified preliminary hold having a determined time duration of less than a predetermined time duration; and outputting and saving the identified preliminary holds onto a computer readable medium for at least one of review by an individual, production of a graphical display on a computer terminal, and production of a presentation document identifying the identified preliminary holds.

* * * * *